(12) United States Patent
Gormley

(10) Patent No.: US 8,483,731 B2
(45) Date of Patent: Jul. 9, 2013

(54) SYSTEMS AND METHODS FOR BASE STATION REFERENCE FREQUENCY CORRECTION AND TIMING CORRECTION USING TRANSCEIVER FEEDBACK

(75) Inventor: Eamonn Gormley, Redmond, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 148 days.

(21) Appl. No.: 12/701,930

(22) Filed: Feb. 8, 2010

(65) Prior Publication Data

US 2010/0216452 A1 Aug. 26, 2010

Related U.S. Application Data

(60) Provisional application No. 61/155,062, filed on Feb. 24, 2009.

(51) Int. Cl.
*H04B 7/00* (2006.01)
*H04B 15/00* (2006.01)

(52) U.S. Cl.
USPC .......................... 455/502; 455/208; 370/350

(58) Field of Classification Search
USPC ................... 455/502, 208; 370/350
See application file for complete search history.

(56) References Cited

U.S. PATENT DOCUMENTS

| | | | |
|---|---|---|---|
| 7,024,194 B1 * | 4/2006 | Oksanen | 455/437 |
| 7,221,686 B1 | 5/2007 | Belcea | |
| 2002/0009168 A1 | 1/2002 | Dick et al. | |
| 2003/0081567 A1 | 5/2003 | Okanoue et al. | |
| 2003/0125046 A1 | 7/2003 | Riley et al. | |
| 2004/0127163 A1 | 7/2004 | Schramm et al. | |
| 2004/0157613 A1 | 8/2004 | Steer et al. | |
| 2004/0202119 A1 | 10/2004 | Edge | |
| 2005/0094585 A1 | 5/2005 | Golden et al. | |
| 2005/0163263 A1 | 7/2005 | Gupta et al. | |
| 2006/0034407 A1 * | 2/2006 | Dick et al. | 375/356 |
| 2006/0239391 A1 | 10/2006 | Flanagan | |
| 2006/0270406 A1 | 11/2006 | Kim | |
| 2007/0042795 A1 * | 2/2007 | Mo et al. | 455/502 |
| 2008/0186949 A1 * | 8/2008 | Hafeez et al. | 370/350 |
| 2008/0227474 A1 | 9/2008 | Dick et al. | |
| 2008/0310358 A1 | 12/2008 | Shaheen | |
| 2008/0316994 A1 | 12/2008 | Keevill et al. | |

FOREIGN PATENT DOCUMENTS

KR 10-0281583 B1 8/2000

OTHER PUBLICATIONS

International Search Report and Written Opinion for PCT/US2010/023513 filed on Feb. 8, 2010.
Office Action for U.S. Appl. No. 12/709,372 dated Feb. 14, 2012.
Final Office Action for U.S. Appl. No. 12/709,372 dated Aug. 31, 2012.
International Search Report and Written Opinion for PCT/US2010/24826, filed Feb. 19, 2010.

* cited by examiner

*Primary Examiner* — Vladimir Magloire

(57) ABSTRACT

A wireless communications system includes a radio resource manager, one or more base stations, and one or more wireless transceivers capable of communicating with the base stations. The wireless transceivers are configured to be able to measure the difference in network parameter (e.g. frequency and timing offset) between base stations within their range. These network parameter differences along with other information is communicated to the radio resource manager which is then able to update or correct the signal or signals of one or more base stations using the information from the wireless transceivers.

21 Claims, 10 Drawing Sheets

SYSTEMS AND METHODS FOR BASE STATION REFERENCE FREQUENCY CORRECTION AND TIMING CORRECTION USING TRANSCEIVER FEEDBACK

CROSS REFERENCE TO RELATED APPLICATIONS

The present application claims the benefit of U.S. Provisional Application No. 61/155,062, filed Feb. 24, 2009.

FIELD OF THE INVENTION

The field of the present invention generally relates to wireless communications and specifically to measuring base station signals and synchronizing base stations in a wireless network.

BACKGROUND OF THE INVENTION

In most cellular wireless networks, it is important that base station transmit and receive frequencies are set with a high degree of accuracy. This is even more important with some of the newer airlink technologies such as Orthogonal Frequency Division Multiplexing (OFDM). In an OFDM system the absolute frequency for the signal transmitted from a base station has to meet very tight tolerances. Typical tolerances are of the order of 0.05 Parts Per Million (PPM). Additionally, in some wireless systems, like 4G wireless solutions based on OFDM, it is advantageous for all the base stations in a network to share a common timing reference so that the signals transmitted from the base stations are aligned in time.

There are many solutions for obtaining a long-term high accuracy transmit frequency. Approaches include locking the transmit frequency to a reference frequency provided by an atomic clock, using a reference frequency signal derived from the backhaul connections (e.g. deriving a frequency reference from a T1, E1 or fiber optic cable), or using a frequency reference provided by a Global Positioning System (GPS) receiver. Furthermore, each of these approaches provides a high accuracy timing reference.

The above solutions for obtaining a high accuracy frequency reference and timing reference are suitable for traditional cellular base stations that provide service to a relatively large geographical area, with GPS being the preferred option. These base stations are commonly referred to as macro base stations. The cost of a GPS receiver is relatively low compared to the overall cost of the macro base station. The backhaul approach is also feasible with network operators for their macro base stations. If a frequency reference or timing reference signal is derived from a backhaul connection, the operator of a macro base station can ensure that the signals on the backhaul are locked to a high accuracy frequency and time reference in the first place.

While prior art approaches to coordination and synchronization of base stations in a wireless network are adequate for existing macro base stations, they are not adequate for other types of wireless base stations. The market is shifting to lower cost base stations, commonly referred to as micro and pico base stations, as well as base stations intended for home usage, known as femto base stations. The price points for femto base stations preclude the use of a GPS receiver or atomic clock as a high accuracy frequency reference. Additionally, femto cells are typically installed indoors where a GPS receiver cannot receive a signal from the GPS satellite system that is required to provide the high accuracy frequency reference. The femto base station will typically be connected to a DSL modem or a cable modem over a standard 100BaseT Ethernet connection that cannot provide a sufficiently high accuracy frequency or timing reference. The IEEE 1588 standard for precision clock synchronization over a local area network is another option, but the achievable accuracy is severely limited when this technology is used with femto cells and other low cost wireless base stations connected to the core network over a DSL line or cable modem line. Ovenized oscillators are often utilized in current designs. These may be suitable as a long-term frequency reference, but are still relatively expensive and require calibration. A temperature compensated oscillator could also be used, but the long term frequency stability of such a solution is not sufficient to maintain long term tolerances of 0.05 PPM.

There is a need in present and future wireless networks to provide low-cost, high accuracy frequency and timing references to femto and other base stations in the network. Furthermore, there is a need for wireless networks to be able to update and coordinate the frequency and timing of signals from multiple base stations in the wireless network. There is also a need for providing frequency and timing references to femto and other base stations that do not drift over time like some prior art approaches.

SUMMARY OF THE INVENTION

This invention is aimed at overcoming the disadvantages listed above. This invention introduces systems and methods that utilize the common components of wireless networks or wireless systems to track the differences in frequency and timing signals between base stations in a wireless network. In an embodiment of the present invention, the wireless transceiver measures differences for a network parameter of the wireless base stations with which it can communicate and relays those results back to a Radio Resource Manger. This information may then be stored on a Radio Resource Manager (RRM). The RRM communicates with the base stations in the wireless network. Using the information received from the wireless transceiver, the RRM can then update then send network parameters updating and correction instructions to the base stations in the network. The base stations in the wireless system are capable of updating their network parameters based on the information received from the RRM. In an embodiment of the present invention, the network parameters that are measured by the wireless transceiver and updated at the wireless base stations are the transmit frequency and frame timing signals of the base stations.

In overcoming the above disadvantages associated with modern communication systems, a wireless system in accordance with the present invention includes, but is not limited to, several wireless base stations and at least one transceiver. The transceivers are configured to receive a network parameter of a first wireless base station and retain the network parameter of the first wireless base station. The transceivers then scan for other wireless base stations, receive a network parameter of a second wireless base station, and determine a network parameter difference between the network parameter from the second wireless base station and the retained network parameter.

In accordance with an aspect of the invention, the wireless transceiver communicates the network parameter difference to a Radio Resource Manager.

In accordance with an aspect of the invention, the Radio Resource Manager tracks network parameter accuracies for base stations in the wireless network.

In accordance with an aspect of the invention, the system can correct a network parameter of a wireless base station by using the network parameter difference stored on the Radio Resource Manager.

In accordance with an aspect of the invention, the network parameter difference is a frequency difference.

In accordance with an aspect of the invention, the network parameter difference is a timing signal difference.

In accordance with an aspect of the invention, the wireless transceiver is further configured to receive a second network parameter of the first wireless base station, retain the second network parameter of the first wireless base station, scan for other wireless base stations, and receive a second network parameter of the second wireless base station. The wireless transceiver then determines the second network parameter difference between the second parameter of the second wireless base station and the retained network parameter.

In accordance with an aspect of the invention, the at least one transceiver determines network parameter differences between other pairs of wireless base stations within range of the wireless transceiver.

Furthermore, in order to overcome the disadvantages of the prior systems and methods, a method for determining a network parameter difference between two wireless base stations in a wireless network with several base stations that can communicate with a wireless transceiver, in accordance with the present invention includes, but is not limited to, the wireless transceiver receiving a network parameter of a first wireless base station, retaining the network parameter of the first wireless base station, scanning for other wireless base stations, and the wireless transceiver receiving a network parameter of a second wireless base station. The wireless transceiver determines the network parameter difference between the network parameter received from the second wireless base station and the retained network parameter.

In an embodiment of the present invention, a computer-readable medium encoded with computer readable instructions, which when executed, perform a method for determining a network parameter difference between two wireless base stations in a wireless network operable with a plurality of wireless base stations to communicate to a wireless transceiver includes, but is not limited to, the wireless transceiver receiving a network parameter of a first wireless base station, retaining the network parameter of the first wireless base station, scanning for other wireless base stations, and receiving a network parameter of a second wireless base station. The wireless transceiver determines the network parameter difference between the network parameter from the second wireless base station and the retained network parameter.

BRIEF DESCRIPTION OF THE DRAWINGS

Preferred and alternative examples of the present invention are described in detail below with reference to the following Figure drawings.

DETAILED DESCRIPTION

Figure 1:
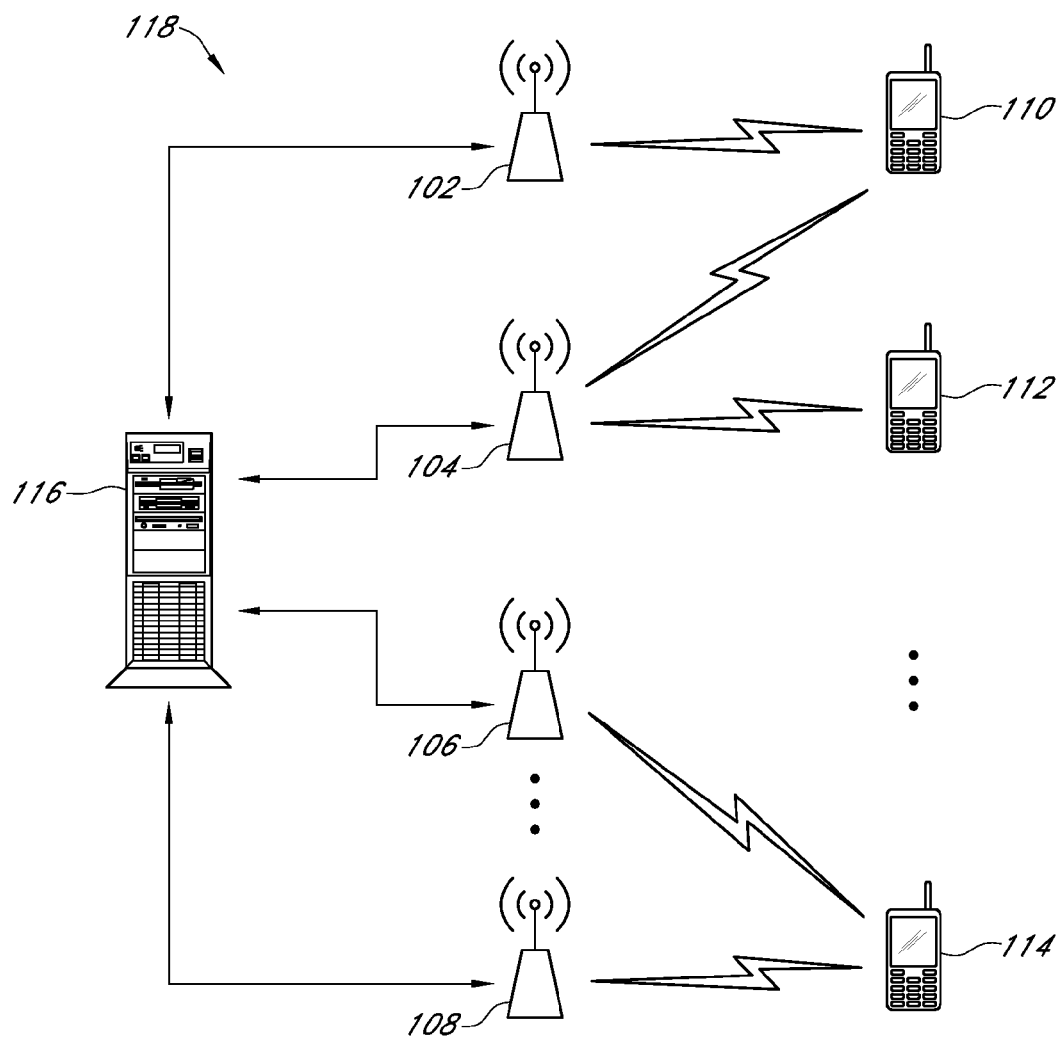
FIG. 1 illustrates a wireless system in accordance with an embodiment of the present invention.

In accordance with an exemplary embodiment of the present invention, FIG. 1 illustrates a wireless communication system 118 comprised of various network elements. The wireless communication system may support a variety of different wireless standards. These standards include but are not limited to Global System for Mobile Communications (GSM), Code Division Multiple Access (CDMA), and Time Division Multiple Access (TDMA) data and voice communications standards as well as OFDM-based standards such as WiFi (WLAN or IEEE 802.11), WiMax (IEEE 802.16), and other fourth generation (4G) wireless standards. The wireless communication system 118 can support voice, data, or combined traffic and may also support analog communications. The wireless communication system 118 may support packetized data transmission for digital standards. Moreover, the wireless communication system may also make use of a time-based framing structure to decide when to transmit different types of data and signals, such as broadcast data, control data, user data, timing and frequency reference signals, channel estimation signals, etc. In FIG. 1, four wireless base stations are shown: 102, 104, 106, and 108. These wireless base stations provide wireless communications and services to wireless transceivers such as 110, 112, and 114 within radio range. The wireless base stations may vary in structure and capabilities from each other. Some may be macro base stations, which are typically installed on radio towers to provide wireless services to subscribers over a large geographic area. Other base station types include micro and pico base stations, which are typically of lower transmit power than macro base stations and provide wireless services to fewer subscribers over a smaller geographic area. Smaller base stations like femto base stations typically provide wireless services to a handful users in a home or office environment. The present embodiment may include each of these types of base stations or may be comprised solely of base stations of a single type. Each base station in wireless communication system 118 transmits and receives signals that can be characterized by a set of attributes. These attributes, also called network parameters, describe the signal and contain important information necessary for devices that communicate with the base stations.

The wireless transceivers 110, 112, and 114 may be cell phones, smart phones, personal data assistants (PDAs), gaming devices, portable media players, laptop computers, electronic readers, web tablets, netbooks, or any other electronic device configured to communicate in the wireless system 118. The wireless transceivers need not be mobile devices. They may be personal computers (PCs), servers, set top boxes, or personal media receivers. The wireless transceivers may run an operating system such as Microsoft Windows™, Mac OS™, Chrome OS™, Palm OS™, Blackberry OS™, Linux™, or Unix™ or any other operating system. Wireless transceivers have antennas and modulation/demodulation hardware capable of sending and receiving information over the wireless communications system. Additionally, the wireless transceivers may also include a microprocessor or microcontroller, random access memory (RAM), read only memory (ROM), and a battery or batteries. They may also include a display such as liquid crystal display (LCD), a touch screen, buttons, knobs, or other tactile input components, a microphone, or speakers. Wireless transceivers may also include ports supporting various types of connections such as Universal Serial Bus (USB), Firewire, and High Definition Multimedia Interface (HDMI). The wireless transceiver may also have a port that allows it to dock to a computer. The wireless communication system of the present embodiment also includes a Radio Resource Manager (RRM) 116. The Radio Resource Manager 116 may be a separate computer such as a server. In other embodiments, it may be housed in the hardware of a base station. In the present embodiment, the RRM 116 is connected to the wireless base stations 102, 104, 106, and 108. These connections can be wireline, wireless, or a mix of the two. Wireline connections may be fiber optic, T1, E1, Ethernet, coaxial cable, or Digital Subscriber Line (DSL). Wireless connections may be microwave or satellite based. In embodiments of this invention, the RRM may be connected to the various base stations using a variety of backhaul technologies appropriate to the base station and the needs of the network at large. In an embodiment of the present invention, the backhaul connection also provides larger network services such as connections with a voice network or the Internet to the base stations on the wireless communication network. In other embodiments of the present invention, different backhaul connections are used to connect the base stations with the RRM 116 and the larger network services. The RRM 116 is configured to receive information from wireless transceivers 110, 112, and 114 through the wireless communication system 118. Network parameter information transmitted by the wireless transceivers 110, 112, and 114 to the wireless network is received by the RRM 116. Furthermore, in other embodiments, as previously discussed, the RRM may be implemented in a variety of ways. The RRM may be implemented using several servers or computers networked together. The RRM may also be implemented using hardware in an existing base station. The RRM may also be implemented as a distributed computing system, using computer resources networked together at a variety of locations. Moreover, wireless networks in accordance with the present invention may also have more than one RRM.

The Radio Resource Manager 116 is generally responsible for processing network parameter information and communicating processed network parameter information to and from the wireless base stations 102, 104, 106, and 108 in the wireless communications system. In an embodiment of the invention, the RRM 116 maintains a database for the purpose of storing information about the base stations in the wireless communications system. In the database stored on the RRM 116, each base station is identified by a unique identifier. The RRM 116 may store the base station type (e.g., macro, micro, pico, femto) in the database. In an embodiment of the invention, the RRM 116 may store a copy of various network parameters for each base station. The network parameters the RRM 116 may store for each base station include but are not limited to frequency parameters such as carrier frequencies and timing signal information. The network parameters for each base station may be stored in the database of the RRM 116 as a value for the network parameter of the base station or as a difference or offset value of the network parameter of the base station with reference to a set value or a value of a network parameter of a certain base station.

In an embodiment of the invention, values for network parameters of the base stations in the wireless communication network are stored in the database of the RRM 116 with reference to a base station with highly accurate network parameters such as a macro base station. In an embodiment of the invention, the RRM 116 may store information pertaining to the relative accuracy of the network parameters configured at each base station. The information pertaining to the relative accuracy of the network parameters may consist of data on the type of frequency or timing reference available at the base station and data on when network correction parameters were sent to the base station and the value of such correction parameters. The information pertaining to the relative accuracy of the network parameters may be updated by the RRM 116 based upon network parameter differences received from the transceivers 110, 112 and 114.

In the exemplary embodiment of the invention illustrated in FIG. 1, transceivers such as 114 are able to communicate with multiple base stations such as 106 and 108. As a wireless transceiver moves, it may connect and disconnect with base stations as it move in and out of the range of the base station. Furthermore, a wireless transceiver may scan periodically for base stations within its range. Alternatively, a wireless transceiver may be prompted either by the user or by the network to scan for base stations within its range.

Figure 2:
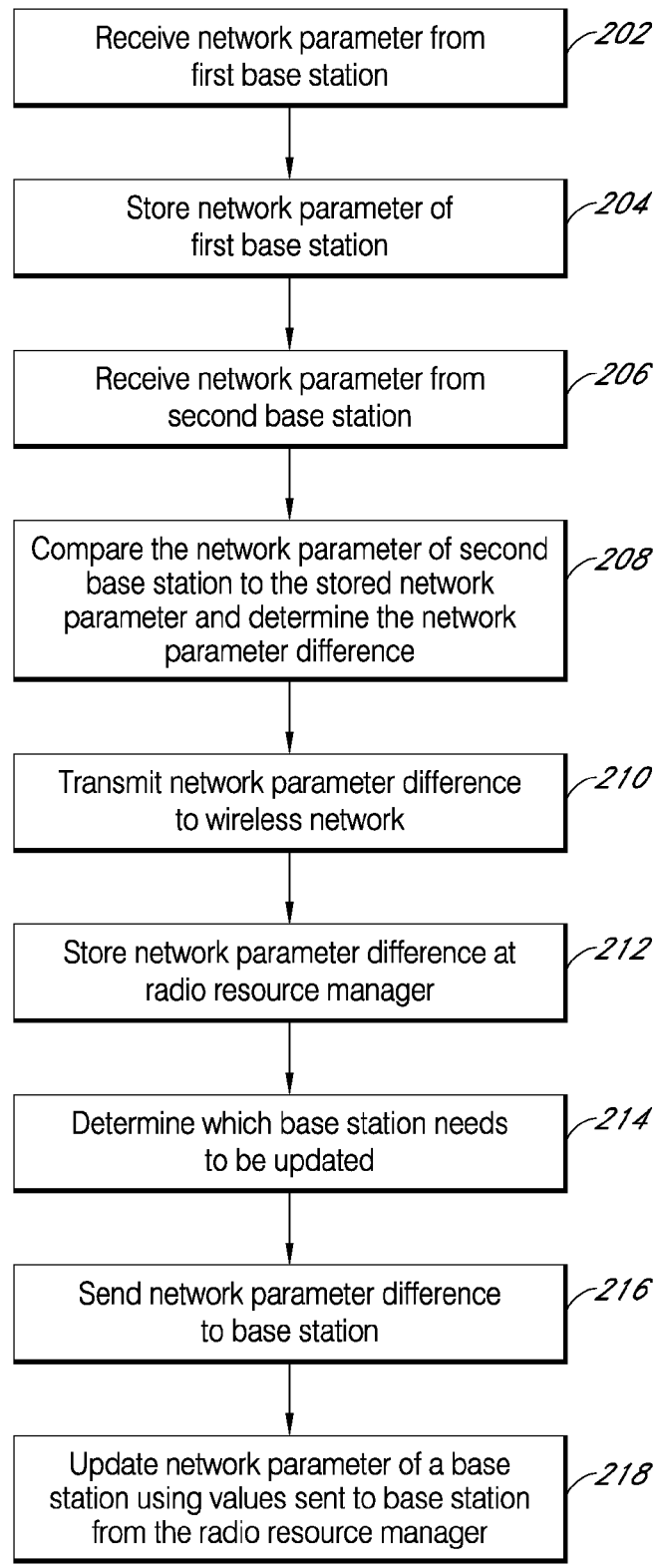
FIG. 2 illustrates a flowchart for determining a network parameter difference between two base stations and for adjusting a base station accordingly.

In accordance with an embodiment of the invention, FIG. 2 illustrates a flowchart for determining a network parameter difference between two base stations and for adjusting a base station accordingly. In block 202, the wireless transceiver receives a network parameter from a first base station. The network parameter may be any characteristic of the signal between the wireless base station and the wireless transceiver. In embodiments of the present invention, the network parameter may be a frequency such as a carrier frequency for a wireless channel or it may be a timing signal such as a frame timing signal. In an embodiment of the invention, the first base station is the base station that the wireless transceiver is already connected to. The wireless transceiver has already locked onto the frequency and aligned in time with this base station. In other embodiments, the first base station may be the base station with the strongest signal or it may be chosen by the user or the RRM. In block 204, the network parameter of the first base station is stored or retained by the wireless transceiver. The wireless transceiver may store or retain the network parameter in a variety of ways. In an embodiment of the present invention, it may store the network parameter in a register used to set the frequency of its local oscillator. In other embodiments, it may store the network parameter digitally in local memory. After the network parameter of the first base station is retained by the wireless transceiver, the wireless transceiver may scan for other base stations in its range. The wireless transceiver may be programmed to scan for additional base stations periodically. In other embodiments, the transceiver may be directed to scan for other base stations by the user or by the RRM. In other embodiments, the wireless transceiver may be programmed to scan for additional base stations when certain parameters have been met such as the signal from the base station serving the wireless transceiver is weakening or that the wireless transceiver is moving. These embodiments are non-exclusive; the wireless transceiver may begin its scan for any combination of the embodiments listed above.

In block 206, the wireless transceiver receives the network parameter of the second base station. The network parameter received from the second base station is of the same type as the network parameter received from the first base station. In an embodiment of the invention, the wireless transceiver may receive the network parameter by locking onto to the signal of the second base station.

In block 208, the network parameter received from the network base station is compared to the network parameter stored or retained by the wireless transceiver to determine the network parameter difference. In an embodiment of the invention, the network parameter difference may be determined by microprocessor or logic unit in the wireless transceiver. In an embodiment of the invention, the network parameter difference may be determined without the use of a microprocessor or microcontroller.

In block 210, the wireless transceiver communicates the network parameter difference to the wireless network. In an embodiment of the invention, the wireless transceiver relays the network parameter difference back to the wireless network by transmitting it to the base station with which it is presently connected. This may be the first base station or the second base station or another base station not involved in the comparison. In an embodiment of the invention, the wireless transceiver may store the network parameter difference. The wireless transceiver may also be capable of transmitting the network parameter difference back to the wireless communications network via a wireline connection. The wireless transceiver may be able to dock with a computer and transmit the network parameter difference back to the wireless communication system via the computer's network connection. In an embodiment of the invention, the wireless transceiver may be operable to send more than just the network parameter difference back to the wireless communication network. The wireless transceiver may also send back the base station identifiers for the two base stations from which it received signals and for which it measured the network parameters. The wireless transceiver may also send back the values for the network parameters from each of the base stations from which it received signals. The wireless transceiver may also send back other values that the RRM may use to calculate adjustments for base stations on the wireless network.

In block 212, the network parameter difference is received or stored by the Radio Resource Manager. As mentioned above, in an embodiment of the invention, the RRM may store the network parameter difference as well as other values transmitted to it by the wireless transceiver in the database. The RRM may store the network parameter difference and also use the network parameter difference to update the entry for either the first or the second base station or both. Furthermore, the RRM may discard the network parameter difference once all applicable base stations have had their entries updated in the database.

In block 214, the RRM determines which base stations need to have their network parameters updated. Once the RRM has received and stored the network parameter difference from the wireless transceiver, it is able to determine whether the network parameters of any of the base stations need to be updated. The RRM can make this determination in a variety of ways. The RRM may store network tolerances for each network parameter it tracks and correct base station network parameters that fall outside those tolerances. The RRM may examine the differences in network parameters between specific base stations and update one or more of the base station network parameters if the difference in a network parameter is too high. In an embodiment of the invention, the RRM may set a network parameter for one or more base stations to match the network parameter of a reference base station. This reference base station may be a macro base station with an accurate network parameter. The RRM may direct two base stations with a network parameter difference between their network parameters to adjust their network parameters to a value between the two present values of their network parameters. The RRM may direct two or more base stations to adjust their network parameter settings to another value for the network parameter selected by the RRM. A system administrator may also direct the RRM to alter the network parameter of a base station to a value of the administrator's choosing or to the value of the network parameter of another base station.

In block 216, the Radio Resource Manager sends the network parameter difference the base station that needs its network parameter adjusted. The base station is the base station which the RRM has selected for updating as detailed above. In an embodiment of the invention, the RRM may also send, in addition to or in place of the network parameter difference, other values which the base station can then use to update its signal. These values may be a value of the network parameter to which the base station will adjust its value of the network parameter. The value may also be another value that the base station can then use to adjust the network parameter of its signal, such as half the network parameter difference. The network parameter difference may be a signed value that indicates to the base station whether it needs to be added to or subtracted from the present value of the network parameter of the base station. In an embodiment of the invention, the RRM may send to the base station directions on how to implement the adjustments such as whether to add or subtract the sent value from the RRM from the present value of the network parameter of the base station, replace the present value of the network parameter of the base station with the value sent from RRM, or some other instructions to use the value sent from the RRM to update the value of the network parameter of the base station.

In block 218, the base station updates its network parameter using the values sent to the base station from the Radio Resource Manager.

In an embodiment of the invention, the wireless transceiver may send more than one network parameter difference to the RRM. The wireless transceiver may send a variety of network parameter differences such frequency difference measurements, or time difference measurements, or both to the RRM in the form of a network parameter or frequency/time difference measurement report. The frequency/time difference measurement reports may include details on the serving base station and the identification of the base station to which the frequency differences and timing differences and possibly other network parameter differences pertain. The frequency/time difference measurement reports can optionally include the expected transmit frequencies of the serving base station and the base station to which the frequency difference pertains. The frequency/time offset report can also optionally include information on the speed and/or direction that the wireless transceiver is travelling, or whether or not the wireless transceiver is moving more than a certain speed (e.g. 5 km/hr), if such information is available. The speed and/or direction information may be used by the RRM to correct for Doppler shifts in the frequency difference reported by the wireless transceiver. The frequency/time offset report may also include information on the location of the wireless transceiver if such information is available.

In an embodiment of the invention, the frequency offset measurement contained in the measurement reports is the frequency difference between what the wireless transceiver measures to be the correct receive frequency (based on the assumption that the transmit frequency of the wireless transceiver's serving base station is correct) and the transmit frequency it receives from the other base station or base stations.

In an embodiment of the present invention, the time offset measurement contained in the measurement reports is the time difference between what the wireless transceiver measures to be the correct timing (based on the assumption that the frame timing of the wireless transceiver's serving base station is correct) and the frame timing it receives from the other base station or base stations.

In an embodiment of the invention, the RRM collects, stores, and analyzes the network parameter measurements made by the wireless transceiver and sent back to the wireless communications network and the RRM including but not limited to the frequency offset measurements, the time offset measurements, or both. The RRM knows which of the base stations already have a high accuracy frequency reference and which base stations do not because this information is stored in the database maintained by the RRM. The RRM can send frequency offset correction instructions and/or time offset correction instructions to those base stations, such as femto base stations, that do not have high accuracy frequency references. Such base stations can then adjust their transmit frequency and/or frame timing based on the instructions received from the RRM.

In an embodiment of the present invention, the RRM also may receive reports from the base stations themselves. The RRM may receive information from the base stations including but not limited to network parameter values like carrier frequency or timing signal information. It may also receive requests from the base stations that certain parameters be updated. Information sent to the RRM may also be stored in the database maintained by the RRM.

In an embodiment of the present invention, the wireless transceiver also sends the RRM the base station ID along with the network parameter difference or other network parameter information to aid the RRM in keeping track of base station information in the database.

In an embodiment of the present invention, the process illustrated in the flowchart in FIG. 2 can repeated. The wireless transceiver may repeat the process between the same two base stations but for a different network parameter. In an embodiment of the present invention, the wireless transceiver may first determine the difference in frequency between two base stations and then determine the difference in timing between the same two base stations. Furthermore, the wireless transceiver may also repeat the process illustrated in FIG. 2 for other pairings of base stations. In an embodiment of the invention, the wireless transceiver may repeat the process for each base station it finds during a scan of base stations within range. The wireless transceiver may also repeat the process for multiple network parameters (for instance, frequency and timing) and for every pairing of base stations possible within range of the wireless transceiver. Furthermore, several wireless transceivers may simultaneously undertake the process illustrated by FIG. 2 on the same wireless communications network. In this embodiment, the RRM collects network parameter information from multiple wireless transceivers and uses this information collectively to make decisions about which base stations need their various network parameters updated.

Figure 3:
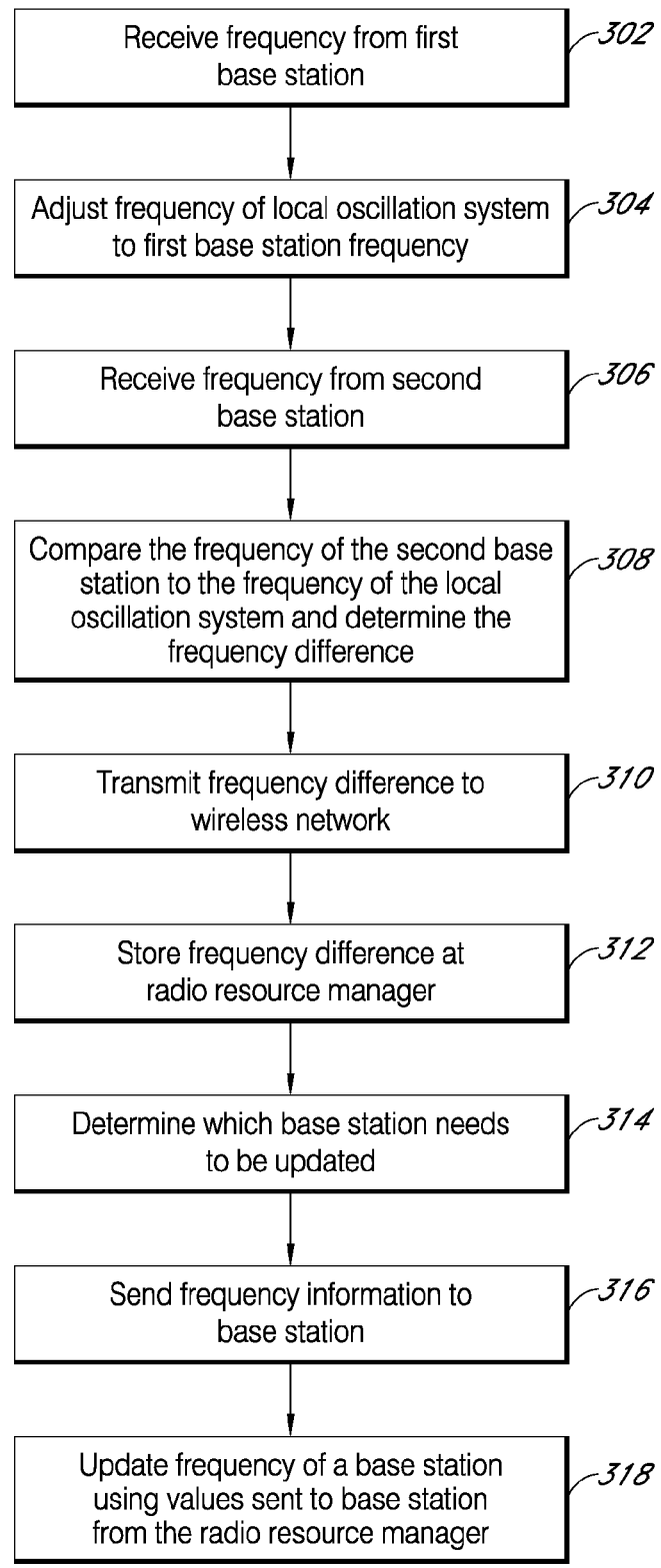
FIG. 3 illustrates a flowchart for determining a frequency difference between two base stations and for adjusting a base station accordingly.

FIG. 3 illustrates a flowchart for determining a frequency difference between two base stations and for adjusting a base station frequency accordingly in accordance with an embodiment of the present invention. In block 302, the wireless transceiver receives the frequency from the first base station. In embodiments of the present invention, the frequency may be a carrier frequency for a wireless channel. In an embodiment of the invention, the first base station is the base station that the wireless transceiver is already connected to. The wireless transceiver has already locked onto the frequency and aligned in time with this base station. In other embodiments, the first base station may be the base station with the strongest signal or it may be chosen by the user or the RRM.

In block 304, the wireless transceiver adjusts the frequency of the local oscillation system to the frequency of the first base station. After the frequency of the first base station is stored by the wireless transceiver, the wireless transceiver may scan for other base stations in its range. The wireless transceiver may be programmed to scan for additional base stations periodically. In other embodiments, the transceiver may be directed to scan for other base stations by the user or by the RRM. In other embodiments, the wireless transceiver may be programmed to scan for additional base stations when certain parameters have been met such as the signal from the base station serving the wireless transceiver is weakening or that the wireless transceiver is moving. These embodiments are non-exclusive; the wireless transceiver may begin its scan for any combination of the embodiments listed above.

In block 306, the wireless transceiver receives the frequency from the second base station. In block 308, the wireless transceiver compares the second base station frequency to the frequency of the local oscillation system and determines the frequency difference between the two. This step may be accomplished using a microprocessor or microcontroller in the wireless transceiver. In an embodiment of the present invention, the comparison may be accomplished using a frequency comparator in the apparatus illustrated in FIG. 5.

In block 310, the wireless transceiver communicates the frequency difference to the wireless network. In an embodiment of the invention, the wireless transceiver may be operable to communicate more than just the network parameter difference back to the wireless communications network. The wireless transceiver may also send back the base station identifiers for the two base stations from which it received signals. The wireless transceiver may also send back the values for the frequencies from each of the base stations from which it received signals. The wireless transceiver may also send back other values that the RRM may use to calculate adjustments for base stations on the wireless network.

In block 312, the RRM receives and stores the frequency difference. As mentioned above, in an embodiment of the invention, the RRM may store the frequency difference in a database. The RRM may store the frequency difference and also use the frequency difference to update the database entry for either the first or the second base station or both. Furthermore, the RRM may discard the frequency difference once all applicable base stations have had their entries updated in the database. In an embodiment of the present invention, the RRM may also store other information obtained from the wireless transceivers in the database.

In block 314, the RRM determines which base station or base stations need to have their frequencies updated. The RRM can make this determination in a variety of ways. The RRM may store network tolerances for each network parameter, including frequencies, it tracks and update base station frequencies that fall outside those tolerances. The RRM may examine the differences in frequencies between specific base stations and update one or more base station frequencies if the difference in frequency is too high. In an embodiment of the invention, the RRM may set a frequency for one or more base stations to match the frequency of a reference base station. This reference base station may be a macro base station with an accurate frequency reference, or a base station with an inaccurate frequency reference that has previously had its frequency updated to an accurate frequency. The RRM may direct two base stations with a frequency difference between their present frequencies to adjust their frequencies to a value between the two present values of their frequencies. The RRM may direct two or more base stations to adjust their frequency settings to another value for the frequency selected by the RRM. A system administrator may also direct the RRM to alter the frequency of a base station to a value of the administrator's choosing or to the value of the frequency of another base station.

In block 316, the Radio Resource Manager sends the frequency correction information to the base station. In an embodiment of the invention, the RRM may also send, in addition to or in place of the frequency difference, other values which the base station can then use to update its frequency. These values may be a value of the frequency to which the base station will adjust its own frequency value. The value may also be another value that the base station can then use to adjust the frequency of its signal, such as half the frequency difference. The frequency difference may be a signed value that indicates to the base station whether it needs to be added to or subtracted from the present value of the frequency of the base station. In an embodiment of the invention, the RRM may send to the base station directions on how to implement the adjustments such as whether to add or subtract the sent value from the RRM from the present value of the frequency of the base station, replace the present value of the frequency of the base station with the value sent from RRM, or some other instructions to use the value sent from the RRM to update the value of the frequency of the base station.

In block 318, the base station updates its frequency using the values sent to the base station from the Radio Resource Manager.

Figure 4:
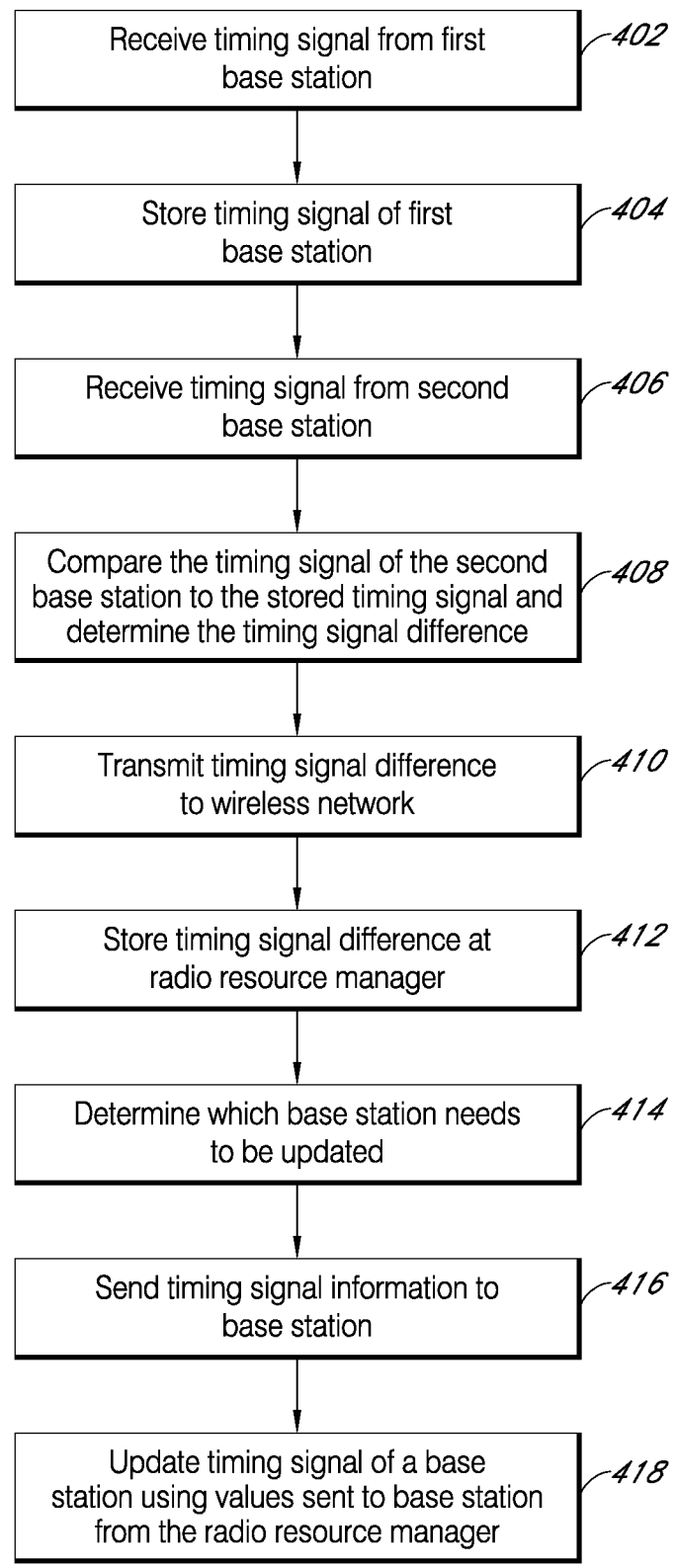
FIG. 4 illustrates a flowchart for determining a timing signal difference between two base stations and for adjusting a base station accordingly.

FIG. 4 illustrates a flowchart for determining a timing difference between two base stations and for adjusting the timing of a base station in accordance with an embodiment of the present invention. In block 402, the wireless transceiver receives the timing signal from the first base station. In embodiments of the present invention, the timing signal may be a frame timing signal for a wireless channel. In an embodiment of the invention, the first base station is the base station that the wireless transceiver is already connected to. The wireless transceiver has already locked onto the frequency and aligned in time with this base station. In other embodiments, the first base station may be the base station with the strongest signal or it may be chosen by the user or the RRM.

In block 404, the wireless transceiver stores or retains the timing signal. The timing signal may be stored in the RAM of the wireless transceiver or it may be stored by aligning an internal timer of the demodulation system of the wireless transceiver to that of the first base station. After the timing signal of the first base station is stored by the wireless transceiver, the wireless transceiver may scan for other base stations in its range. The wireless transceiver may be programmed to scan for additional base stations periodically. In other embodiments, the transceiver may be directed to scan for other base stations by the user or by the RRM. In other embodiments, the wireless transceiver may be programmed to scan for additional base stations when certain parameters have been met such as the signal from the base station serving the wireless transceiver is weakening or that the wireless transceiver is moving. These embodiments are non-exclusive; the wireless transceiver may begin its scan for any combination of the embodiments listed above.

In block 406, the wireless transceiver receives the timing signal from the second base station. In block 408, the wireless transceiver compares the second base station timing signal to the timing signal already stored and determines the timing signal difference between the two. This step may be accomplished using a microprocessor or microcontroller in the wireless transceiver. In an embodiment of the present invention, the comparison may be accomplished using a timing signal comparator in conjunction with the apparatus illustrated in FIG. 6.

In block 410, the wireless transceiver transmits the timing signal difference to the wireless network. In an embodiment of the invention, the wireless transceiver may be operable to send more than just the timing signal difference back to the wireless communications network. The wireless transceiver may also send back the wireless communications the base station identifiers for the two base stations from which it received signals. The wireless transceiver may also send back the values for the timing signals from each of the base stations from which it received signals. The wireless transceiver may also send back other values that the RRM may use to calculate adjustments for base stations on the wireless network.

In block 412, the RRM receives and stores the timing signal difference. As mentioned above, in an embodiment of the invention, the RRM may store the timing signal difference in a database. The RRM may store the timing signal difference and also use the timing signal difference to update the entry for either the first or the second base station or both. Furthermore, the RRM may discard the timing signal difference once all applicable base stations have had their entries updated in the database.

In block 414, the RRM determines which base station or base stations need to have their timing adjusted. The RRM may make this determination in a variety of ways. The RRM may store network tolerances for each network parameter, including timing signals it tracks and send timing correction instruction to base stations whose timing signals fall outside those tolerances. The RRM may examine the differences in timing signals between specific base stations and correct one or more of the base stations if the difference in timing signals is too high. In an embodiment of the invention, the RRM may send instructions to adjust a timing signal for one or more base stations to match the timing signal of a reference base station. This reference base station may be a macro base station with an accurate timing reference. The RRM may direct two base stations with a timing signals difference between their present timings to adjust their timings to a value between the two present values of their timing signals. The RRM may direct two or more base stations to adjust their timing settings to another value for the timing signal selected by the RRM. A system administrator may also direct the RRM to alter the timing signal of a base station to a value of the administrator's choosing or to the value of the timing signal of another base station.

In block 416, the Radio Resource Manager sends the timing signal adjustment information to the base station. In an embodiment of the invention, the timing signal adjustment information may include the timing signal difference. In an embodiment of the invention, the RRM may also send, in addition to or in place of the timing signal difference, other values which the base station can then use to update its signal. These values may be a value of the timing signal to which the base station will adjust its value of the timing signal. The value may also be another value that the base station can then use to adjust the timing of its signal, such as half the difference between timing signals. The timing signal difference may be a signed value that indicates to the base station whether it needs to be added to or subtracted from the present value of the timing signal of the base station. In an embodiment of the invention, the RRM may send to the base station directions on how to implement the adjustments such as whether to add or subtract the sent value from the RRM from the present value of the timing signal of the base station, replace the present value of the timing signal of the base station with the value sent from RRM, or some other instructions to use the value sent from the RRM to update the value of the timing signal of the base station.

In block 418, the base station updates its timing signal using the values sent to the base station from the Radio Resource Manager.

Figure 5:
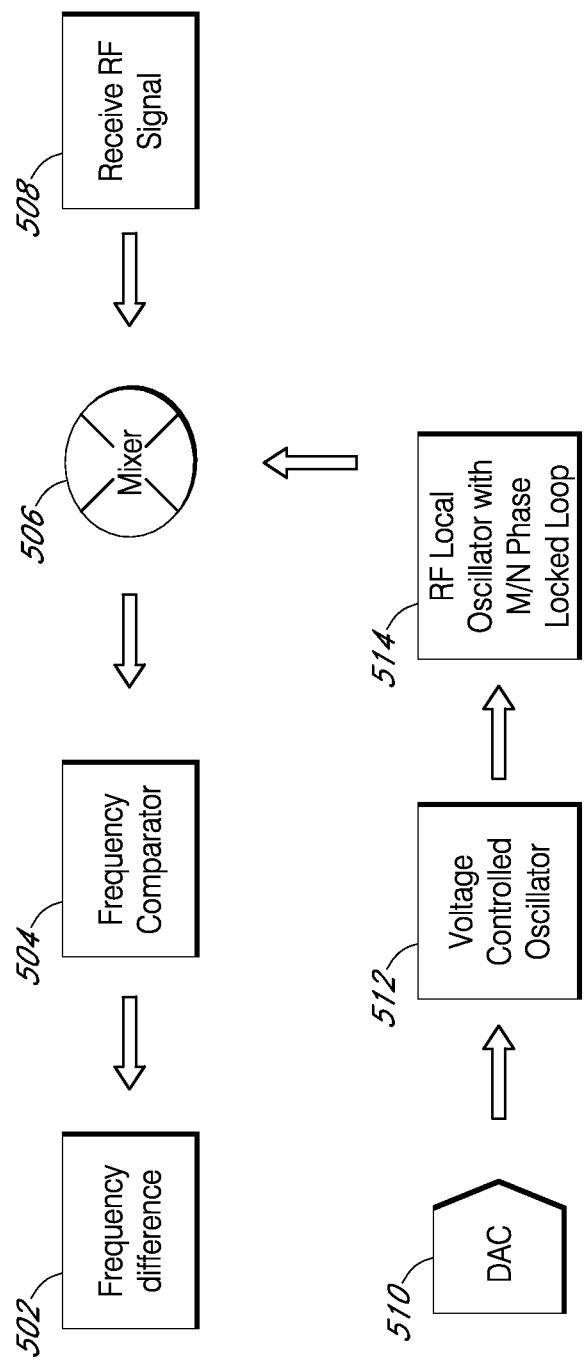
FIG. 5 illustrates an apparatus for estimating frequency offset between a retained frequency and a received frequency.

FIG. 5 illustrates an apparatus for estimating frequency offset between a retained frequency and a received frequency. In an embodiment of the present invention, the wireless transceiver contains a Voltage Controlled Oscillator (VCXO) 512 controlled by a Digital to Analog Converter (DAC) 510. When the wireless transceiver synchronizes with the first base station, which in some embodiments of the present invention may be its serving base station, the wireless transceiver first sets up the appropriate M and N coefficients in the RF Local Oscillator (RF LO) with M/N Phase Locked Loop 514 to coarsely set the receive frequency. The wireless transceiver then makes fine corrections to the VCXO 512 frequency by adjusting the input to the digital to analog converter (DAC) 510 or some other method so that the frequency difference output 502 of the frequency comparator 504 is zero at the beginning of the process illustrated by FIG. 3.

When the wireless transceiver selects the second base station, which in some embodiments of the present invention my be done after scanning for other base stations, the voltage controlling the VCXO 512 is maintained at the setting for which synchronization with the serving base station was achieved. In an embodiment of the invention, if necessary, a different receiver frequency can be set at the wireless transceiver by changing the multipliers (M/N) contained in the RF LO Phase Locked Loop (PLL) 514. The frequency comparator 504 of the wireless transceiver can estimate the difference in frequency between the received signal from the first base station and the received RF signal 508 of the second base station. The two signals are both fed into the mixer 506 and the output sent to the frequency comparator 504. In an embodiment of the present invention, the frequency error estimation can be performed by prior art methods such as examining the phase changes on reference signals, or other such methods. In an embodiment of the present invention, the frequency difference 502 at the output of the frequency comparator 504 may be scaled (i.e. multiplied by a constant) to determine the absolute frequency difference between the frequency of the signal of the second base station from the received RF signal 508 and the frequency from the RF LO 514.

Figure 6:
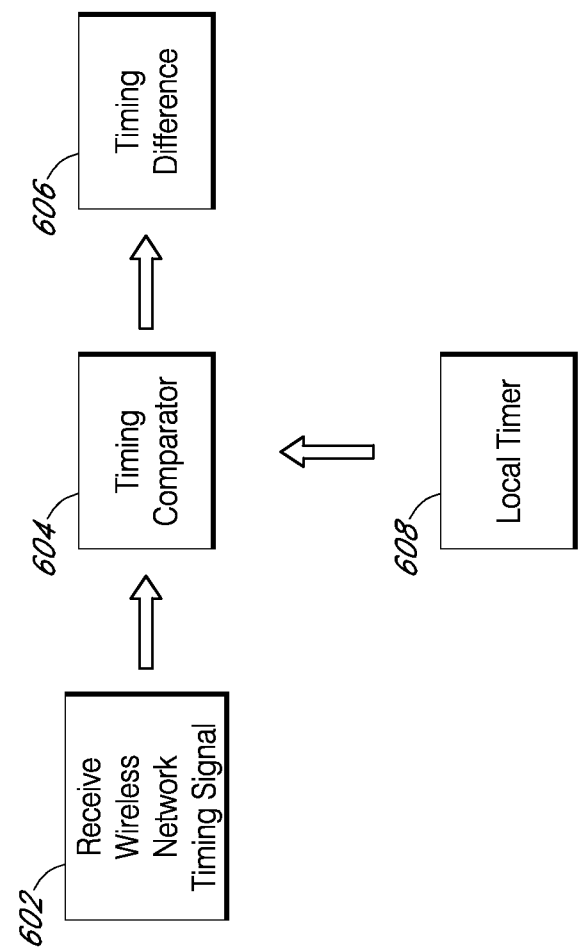
FIG. 6 illustrates an apparatus for estimating the timing signal offset between a retained timing signal and a received timing signal.

FIG. 6 illustrates an apparatus for estimating the timing signal offset between a retained timing signal and a received timing signal in accordance with an embodiment of the present invention. The local timer 608 retains the timing signal of the first base station. In an embodiment of the present invention, the first base station is also the wireless transceiver's serving base station, providing the wireless transceiver with network services. The wireless transceiver receives the wireless network timing signal 602 from the second base station. These timing signals are fed into a timing comparator 604. The timing comparator 604 determines the difference between the two inputs and outputs the timing difference 606.

Figure 7:
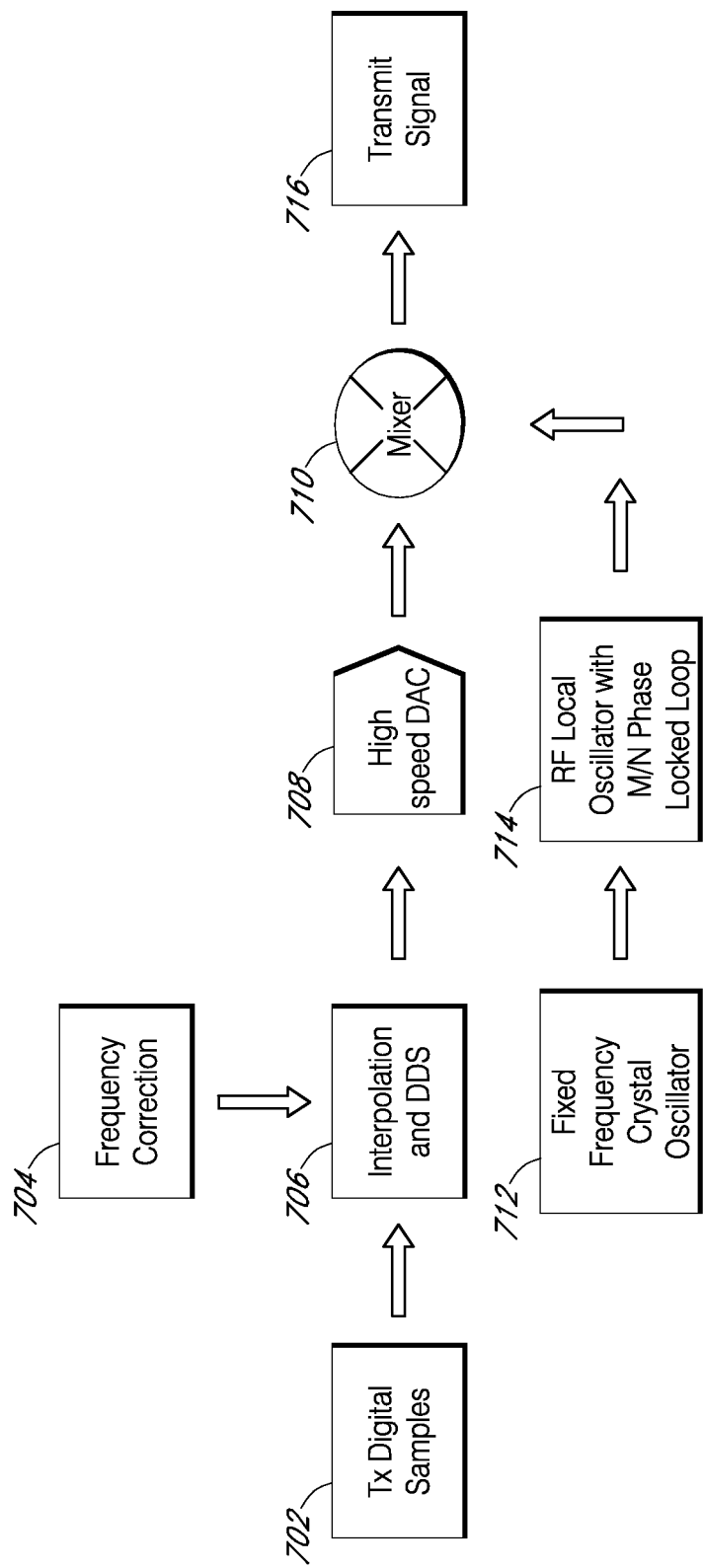
FIG. 7 illustrates an apparatus for correcting a frequency using direct digital synthesis.

FIG. 7 illustrates an apparatus for correcting a frequency by adjusting the input to the direct digital synthesizer and interpolator. The apparatus in FIG. 7 is a modulation unit housed at a base station in the wireless communications system. The RF Local Oscillator with M/N Phase Locked Loop (RF LO) 714 is driven by a Fixed Frequency Crystal Oscillator 712. Tx Digital samples 702 representing the data to be modulated and sent out over the network are fed into the Interpolation and Direct Digital Synthesis subcomponent 706 of the apparatus. Direct digital synthesis is a way of creating waveforms digitally. Along with interpolation, which inserts samples in between two existing samples in a predetermined fashion (e.g. linearly) and at predetermined intervals (e.g. one sample equally spaced between two existing samples), the direct digital synthesis performed by the Interpolation and DDS subcomponent 706 formats the data in a way that can be fed into the High Speed Digital to Analog Converter (DAC) 708. The High Speed DAC 708 converts the digital waveform into an analog waveform to be mixed by the mixer 710 with the signal from the RF LO 714. The output of the mixer 710 is a transmit signal 716 that can be sent to an antenna of the base station (not pictured) to be broadcast over the airwaves. The transmit signal 716 is a modulated signal with a carrier frequency or center frequency that is either the sum or difference of the RF LO 714 frequency and the center frequency of the analog waveform. In the apparatus of FIG. 7, the frequency correction 704 information is input into the Interpolation and DDS subcomponent 706 of the apparatus. The frequency correction information 704 is used to alter the frequency of the digital waveform created by the Interpolation and DDS subcomponent 706. When the frequency corrected digital waveform is converted by the High Speed DAC 708, the resulting signal from the mixer has had its frequency adjusted. The frequency correction 704 information is based on the values sent from the Radio Resource Manager to the base station. In an embodiment of the present invention, this frequency correction information 704 may be the frequency difference measured by the wireless transceiver. In other embodiments of the present invention, the frequency correction 704 information used to alter the digital waveform may include other values received along with or in place of the frequency difference. Depending on the operation of the Interpolation and DDS 706 subcomponent, the values from the RRM may need to be processed and formatted by the base station before they can be inputted into the Interpolation and DDS 706 subcomponent.

Figure 8:
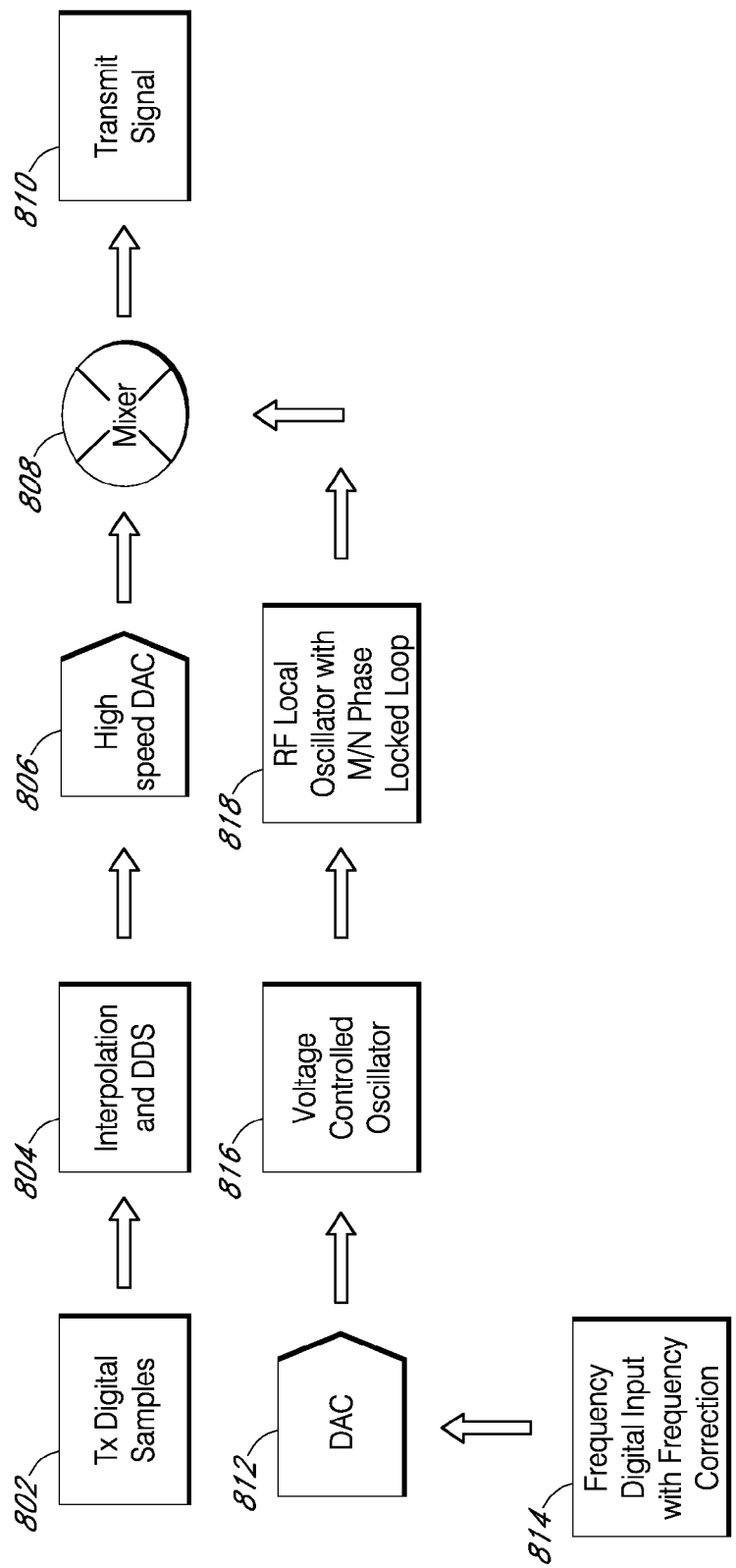
FIG. 8 illustrates an apparatus for correcting a frequency using input to a voltage controlled oscillator.

FIG. 8 illustrates an apparatus for correcting a frequency using input to a voltage controlled oscillator. The apparatus in FIG. 8 is a modulation unit housed at a base station in the wireless communications system. The RF Local Oscillator with M/N Phase Locked Loop (RF LO) 818 is driven by a Voltage Controlled Oscillator (VCXO) 816 with input from a Digital to Analog Converter 812. Tx Digital samples 802 representing the data to be modulated and sent out over the network are fed into the Interpolation and Direct Digital Synthesis subcomponent 804 of the apparatus. Along with interpolation, which inserts samples in between two existing samples in a predetermined fashion (e.g. linearly) and at predetermined intervals (e.g. one sample equally spaced between two existing samples), the direct digital synthesis performed by the Interpolation and DDS subcomponent 804 formats the data in a way that can be fed into the High Speed Digital to Analog Converter (DAC) 806. The High Speed DAC 806 converts the digital waveform into an analog waveform to be mixed by the mixer 808 with the signal from the RF LO 818. The output of the mixer 808 is a transmit signal 810 that can be sent to an antenna of the base station (not pictured)

to be broadcast over the airwaves. The transmit signal 810 is a modulated signal with a carrier frequency or center frequency that is either the sum or difference of the RF LO 814 and the center frequency of the analog waveform. In the apparatus of FIG. 8, the frequency correction information is used to generate the frequency digital input 814 which serves as the input for the VCXO 816. The frequency digital input with frequency correction 814 is converted by the DAC 812 into an analog voltage that can control the VCXO 816. The frequency digital input with frequency correction 814 is based on the values sent from the Radio Resource Manager to the base station. In an embodiment of the present invention, this frequency digital input with frequency correction 814 may be a frequency value based on the frequency difference measured by the wireless transceiver. In other embodiments of the present invention, the frequency digital input with frequency correction 814 used to alter the digital waveform may include other values received along with or in place of the frequency difference. The values from the RRM may need to be processed and formatted by the base station before they can be used as frequency digital input with frequency correction 814.

Figure 9:
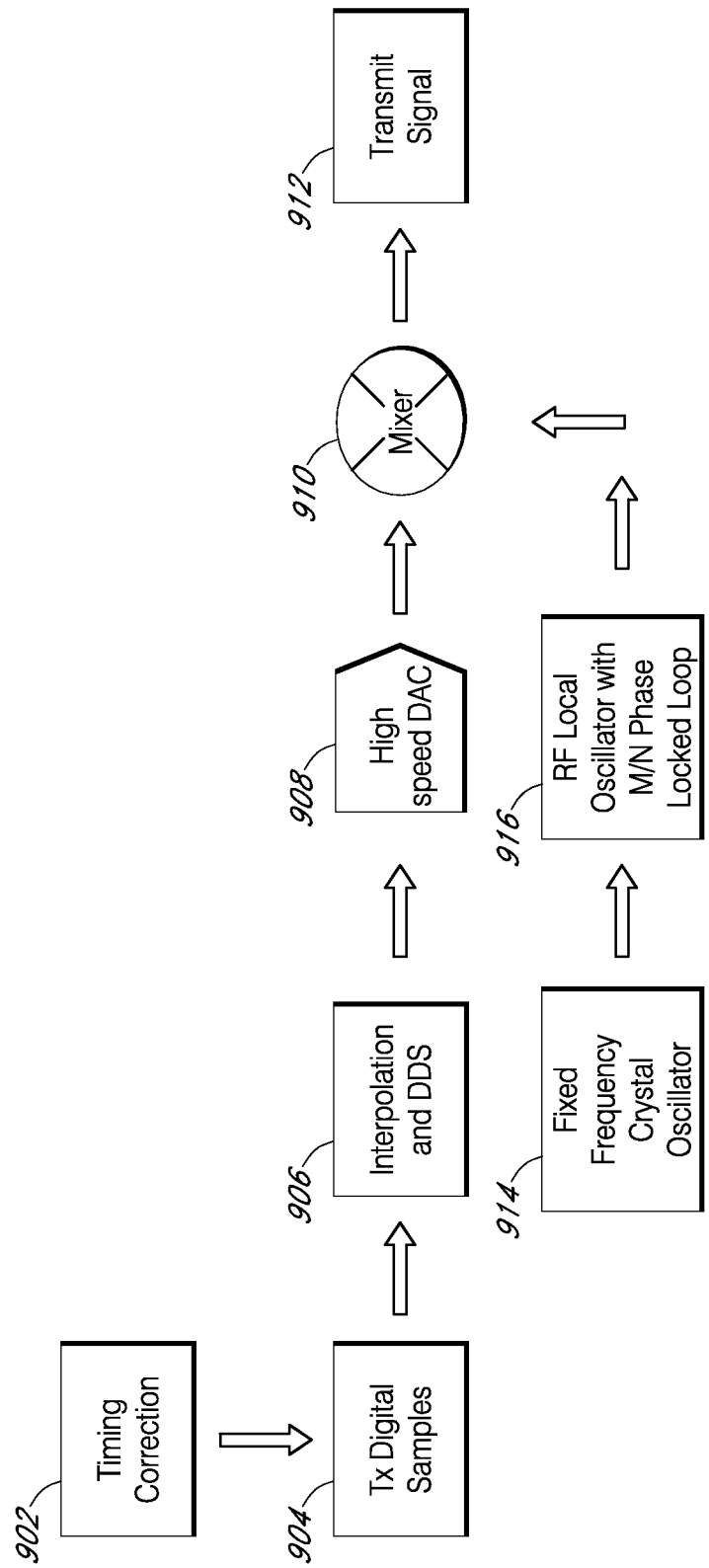
FIG. 9 illustrates an apparatus for correcting a timing signal by delaying or advancing samples in an apparatus with a fixed frequency crystal oscillator.

FIG. 9 illustrates an apparatus for correcting a timing signal by delaying or advancing samples in an apparatus with a fixed frequency crystal oscillator. The apparatus in FIG. 9 is a modulation unit housed at a base station in the wireless communications system. The RF Local Oscillator with M/N Phase Locked Loop (RF LO) 916 is driven by a Fixed Frequency Crystal Oscillator 914. Tx Digital samples 904 representing the data to be modulated and sent out over the network are fed into the Interpolation and Direct Digital Synthesis (DDS) subcomponent 906 of the apparatus. Along with interpolation, which inserts samples in between two existing samples in a predetermined fashion (e.g. linearly) and at predetermined intervals (e.g. one sample equally spaced between two existing samples), the direct digital synthesis performed by the Interpolation and DDS subcomponent 906 formats the data in a way that can be fed into the High Speed Digital to Analog Converter (DAC) 908. The High Speed DAC 908 converts the digital waveform into an analog waveform to be mixed by the mixer 910 with the signal from the RF LO 916. The output of the mixer 910 is a transmit signal 912 that can be sent to an antenna of the base station (not pictured) to be broadcast over the airwaves. The transmit signal 912 is a modulated signal with a carrier frequency or center frequency that is either the sum or difference of the RF LO 916 frequency and the center frequency of the analog waveform. In the apparatus of FIG. 9, the timing correction 902 information is applied to Tx Digital Samples 904. In an embodiment of the present invention, the timing signal is corrected by repeating or deleting samples in the data stream. Repeating a sample delays the waveform in time while deleting a sample advances the waveform in time. The timing correction 902 information is based on the values sent from the Radio Resource Manager to the base station. In an embodiment of the present invention, this timing correction information 902 may be the timing signal difference measured by the wireless transceiver. In other embodiments of the present invention, the timing correction 902 information used to alter the digital waveform may include other values received along with or in place of the frequency difference. Depending on how the data stream Tx Data Samples 904 is constructed, the values from the RRM may need to be processed and formatted by the base station before they can be inputted into the Interpolation and DDS 906 subcomponent.

Figure 10:
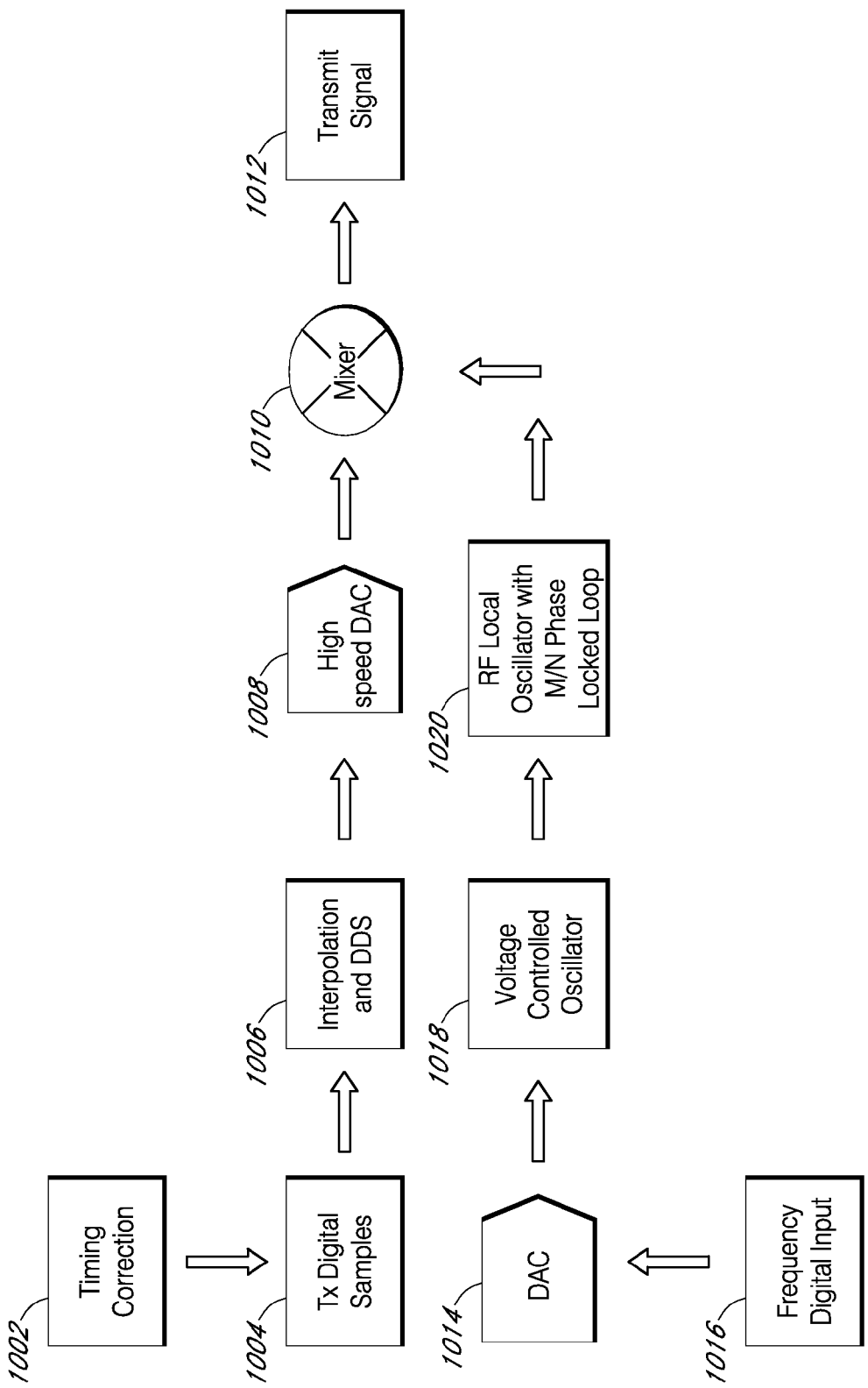
FIG. 10 illustrates an apparatus for correcting a timing signal by delaying or advancing samples in an apparatus with a voltage controlled oscillator.

FIG. 10 illustrates an apparatus for correcting a timing signal by delaying or advancing samples in an apparatus with a voltage controlled oscillator. The apparatus in FIG. 10 is a modulation unit housed at a base station in the wireless communications system. The RF Local Oscillator with M/N Phase Locked Loop (RF LO) 1020 is driven by a Voltage Controlled Oscillator (VCXO) 1018 with input from a Digital to Analog Converter 1014. Tx Digital samples 1004 representing the data to be modulated and sent out over the network are fed into the Interpolation and Direct Digital Synthesis subcomponent 1006 of the apparatus. Along with interpolation, which inserts samples in between two existing samples in a predetermined fashion (e.g. linearly) and at predetermined intervals (e.g. one sample equally spaced between two existing samples), the direct digital synthesis performed by the Interpolation and DDS subcomponent 1006 formats the data in a way that can be fed into the High Speed Digital to Analog Converter (DAC) 1008. The High Speed DAC 1008 converts the digital waveform into an analog waveform to be mixed by the mixer 1010 with the signal from the RF LO 1020. The output of the mixer 1010 is a transmit signal 1012 that can be sent to an antenna of the base station (not pictured) to be broadcast over the airwaves. The transmit signal 1012 is a modulated signal with a carrier frequency or center frequency that is either the sum or difference of the RF LO 1020 frequency and the center frequency of the analog waveform. In the apparatus of FIG. 10, the timing correction 1002 information is applied to Tx Digital Samples 1004. In an embodiment of the present invention, the timing signal is corrected by repeating or deleting samples in the data stream. Repeating a sample delays the waveform in time while deleting a sample advances the waveform in time. The timing correction 1002 information is based on the values sent from the Radio Resource Manager to the base station. In an embodiment of the present invention, this timing correction information 1002 may be the timing signal difference measured by the wireless transceiver. In other embodiments of the present invention, the timing correction 1002 information used to alter the digital waveform may include other values received along with or in place of the frequency difference. Depending on how the data stream Tx Data Samples 1004 is constructed, the values from the RRM may need to be processed and formatted by the base station before they can be inputted into the Interpolation and DDS 1006 subcomponent.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A method for determining a network parameter difference between wireless base stations in a wireless network, the method comprising:
   obtaining a first network parameter of a first wireless base station by a wireless transceiver, the first network parameter including a first frequency information, the first network parameter being obtained by the wireless transceiver using a first carrier frequency for a wireless channel received from the first wireless base station;
   adjusting a frequency of an oscillation system of the wireless transceiver based the first carrier frequency received from the first wireless base station;
   obtaining a second network parameter of a second wireless base station by the wireless transceiver, the second network parameter including a second frequency information, the second network parameter being obtained by the wireless transceiver using a second carrier frequency for a wireless channel received from the second wireless base station;

comparing the second carrier frequency received from the second wireless base station to the adjusted frequency of the oscillation system in order to obtain a frequency offset information, the frequency offset information being part of the network parameter difference;

determining a network parameter difference based on the first network parameter information and the second network parameter information by the wireless transceiver, the network parameter difference including a frequency difference information; and transmitting the network parameter difference to a radio resource manager that is configured to send a network parameter correction instruction to one or more of the wireless base stations in the wireless network based on the network parameter difference received from the wireless transceiver.

2. The method of claim 1, wherein the network parameter difference includes a frequency offset information.

3. The method of claim 1, wherein the first network parameter is obtained by the wireless transceiver using a first carrier frequency for a wireless channel received from the first wireless base station, and wherein the second network parameter is obtained by the wireless transceiver using a second carrier frequency for a wireless channel received from the second wireless base station.

4. The method of claim 1, wherein the first network parameter includes a first timing information, and the second network parameter includes a second timing information.

5. The method of claim 4, wherein the first timing information of the first network parameter is obtained by the wireless transceiver using a first frame timing signal received from the first wireless base station, and wherein the second timing information of the second network parameter is obtained by the wireless transceiver using a second frame timing signal received from the second wireless base station timing signal.

6. The method of claim 4, wherein the network parameter difference includes a timing offset information.

7. The method of claim 1, wherein the first wireless base station is the wireless base station that the wireless transceiver has connected thereto prior to connecting to the second wireless base station.

8. A wireless system comprising:
a plurality of wireless base stations;
at least one transceiver;
wherein the at least one transceiver is configured to:
obtain a first network parameter of a first wireless base station, the first network parameter including a first frequency information, the first network parameter being obtained by the transceiver using a first carrier frequency for a wireless channel received from the first wireless base station;
adjust a frequency of an oscillation system of the wireless transceiver based the first carrier frequency received from the first wireless base station,
obtain a second network parameter of a second wireless base station, the second network parameter including a second frequency information, the second network parameter is obtained by the transceiver using a second carrier frequency for a wireless channel received from the second wireless base station;
compare the second carrier frequency received from the second wireless base station to the adjusted frequency of the oscillation system in order to obtain a frequency offset information, the frequency offset information being part of the network parameter difference;

determine a network parameter difference based on the first network parameter information and the second network parameter information, the network parameter difference including a frequency difference information; and transmit the network parameter difference to a radio resource manager that is configured to send a network parameter correction instruction to one or more of the wireless base stations in the wireless system based on the network parameter difference received from the transceiver.

9. The wireless system of claim 8 wherein the network parameter difference includes a frequency offset information.

10. The wireless system of claim 9 wherein the first network parameter is obtained by the transceiver using a first carrier frequency for a wireless channel received from the first wireless base station, and wherein the second network parameter is obtained by the transceiver using a second carrier frequency for a wireless channel received from the second wireless base station.

11. The wireless system of claim 9 wherein the first network parameter includes a first timing information, and the second network parameter includes a second timing information.

12. The wireless system of claim 11 wherein the first timing information of the first network parameter is obtained by the transceiver using a first frame timing signal received from the first wireless base station, and wherein the second timing information of the second network parameter is obtained by the transceiver using a second frame timing signal received from the second wireless base station timing signal.

13. The wireless system of claim 11, wherein the network parameter difference includes a timing offset information.

14. The wireless system of claim 8 wherein the first wireless base station is the wireless base station that the wireless transceiver has connected thereto prior to connecting to the second wireless base station.

15. A non-transitory computer-readable medium encoded with computer readable instructions, which when executed, perform a method for determining a network parameter difference between wireless base stations in a wireless network, the method comprising:

obtaining a first network parameter of a first wireless base station by a wireless transceiver, the first network parameter including a first frequency information, the first network parameter being obtained by the wireless transceiver using a first carrier frequency for a wireless channel received from the first wireless base station;

adjusting a frequency of an oscillation system of the wireless transceiver based the first carrier frequency received from the first wireless base station;

obtaining a second network parameter of a second wireless base station by the wireless transceiver, the second network parameter including a second frequency information, the second network parameter being obtained by the wireless transceiver using a second carrier frequency for a wireless channel received from the second wireless base station;

comparing the second carrier frequency received from the second wireless base station to the adjusted frequency of the oscillation system in order to obtain a frequency offset information, the frequency offset information being part of the network parameter difference;

determining a network parameter difference based on the first network parameter information and the second network parameter information by the wireless transceiver, the network parameter difference including a frequency difference information; and transmitting the network parameter difference to a radio resource manager that is configured to send a network parameter correction instruction to one or more of the wireless base stations in the wireless network based on the network parameter difference received from the wireless transceiver.

16. The non-transitory computer readable medium of claim 15 wherein the network parameter difference includes a frequency offset information.

17. The non-transitory computer readable medium of claim 15 wherein the first network parameter is obtained by the wireless transceiver using a first carrier frequency for a wireless channel received from the first wireless base station, and wherein the second network parameter is obtained by the wireless transceiver using a second carrier frequency for a wireless channel received from the second wireless base station.

18. The non-transitory computer readable medium of claim 15 wherein first network parameter includes a first timing information, and the second network parameter includes a second timing information.

19. The non-transitory computer readable medium of claim 18, wherein the first timing information of the first network parameter is obtained by the wireless transceiver using a first frame timing signal received from the first wireless base station, and wherein the second timing information of the second network parameter is obtained by the wireless transceiver using a second frame timing signal received from the second wireless base station timing signal.

20. The non-transitory computer readable medium of claim 18 wherein the network parameter difference includes a timing offset information.

21. The non-transitory computer readable medium of claim 15 wherein the first wireless base station is the wireless base station that the wireless transceiver has connected thereto prior to connecting to the second wireless base station.

* * * * *